United States Patent
Queveau et al.

(10) Patent No.: US 7,357,441 B2
(45) Date of Patent: Apr. 15, 2008

(54) AERODYNAMIC IMPROVEMENT FOR CONVERTIBLE CAR

(75) Inventors: Gérard Queveau, Le Pin (FR); Paul Queveau, Montravers (FR); Jacques Gandemer, Nantes (FR); Jean-Paul Bouchet, Casson (FR)

(73) Assignees: Heuliez, Cerizay (FR); CSTB, Nantes (FR)

( * ) Notice: Subject to any disclaimer, the term of this patent is extended or adjusted under 35 U.S.C. 154(b) by 203 days.

(21) Appl. No.: 10/522,163

(22) PCT Filed: Jul. 22, 2003

(86) PCT No.: PCT/FR03/02319

§ 371 (c)(1),
(2), (4) Date: Sep. 27, 2005

(87) PCT Pub. No.: WO2004/009389

PCT Pub. Date: Jan. 29, 2004

(65) Prior Publication Data

US 2006/0103166 A1    May 18, 2006

(30) Foreign Application Priority Data

Jul. 22, 2002    (FR) .................................. 02 09253

(51) Int. Cl.
*B60J 7/22* (2006.01)
(52) U.S. Cl. .............................. 296/180.1; 296/180.5; 296/217

(58) Field of Classification Search ............. 296/180.1, 296/180.5, 217; 454/129, 130, 131, 132, 454/133, 137, 138
See application file for complete search history.

(56) References Cited

U.S. PATENT DOCUMENTS

| | | | |
|---|---|---|---|
| 3,973,478 A * | 8/1976 | Gotz | 296/217 |
| 5,052,745 A | 10/1991 | Preiss | |
| 6,086,146 A * | 7/2000 | Nabuurs | 296/217 |
| 6,253,702 B1 * | 7/2001 | Schoeller, Jr. | 114/361 |
| 6,273,501 B1 * | 8/2001 | Raasakka et al. | 296/217 |
| 6,416,120 B1 * | 7/2002 | Schutt | 296/217 |
| 6,877,800 B2 * | 4/2005 | Maeta et al. | 296/217 |

FOREIGN PATENT DOCUMENTS

| | | |
|---|---|---|
| DE | 88 01 478.5 | 8/1988 |
| DE | 42 39 428 | 3/1994 |
| DE | 197 05 682 | 8/1998 |
| DE | 199 30 049 | 1/2001 |
| DE | 199 55 712 | 5/2001 |
| EP | 0 733 506 | 9/1996 |
| EP | 0 895 889 | 2/1999 |

* cited by examiner

*Primary Examiner*—Jason S Morrow
(74) *Attorney, Agent, or Firm*—Young & Thompson

(57) ABSTRACT

This uncoverable vehicle is of the type including, at least, a windscreen (5), a sliding roof, and two front seats (3, 4); it also includes a wind deflector in the form of a panel (6) fitted with a front rim (7) and a rear rim (8), which panel (6) extends from the trailing edge of the windscreen (5), on the whole width thereof. The deflecting panel (6) is fitted, in its medial portion intended to be situated between both front seats (3, 4), with intrinsic elements (12) laid out to deviate an air flux to the inside of the passenger space, in order to oppose the formation of turbulent recirculations.

16 Claims, 4 Drawing Sheets

AERODYNAMIC IMPROVEMENT FOR CONVERTIBLE CAR

The present invention concerns an aerodynamic improvement made to uncoverable vehicles and in particular to the vehicles of the convertible type, with a sliding roof in the form of a cape hood or a retractable rigid roof, intended for instance to be housed in the rear boot.

The passenger space of this type of vehicle is quite often prone to aerodynamic disturbances when said vehicle is running at high speed, and the different means adopted to limit these disturbances sometimes produce other shortcomings.

Thus, for instance, a solution used consists in installing protection nets, situated at the rear of both foremost seats of the vehicle, to provide a protection for the occupants of these front seats. The shortcoming of this system lies in that it restricts significantly the visibility to the rear; moreover, in a vehicle including two rows of seats, the installation of this type of net seals off the seats arranged at the rear.

The corresponding nets constitute an accessory which requires an intervention on the user's part for the placement thereof, and generally, limited usage since it only affects driving at very high speed. Moreover, when these nets are in active position, they tend to modify the aspect of the vehicle. Finally, as all the accessories, it should also find its place in the vehicle to be stored therein correctly.

The documents EP-0895 889 and EP-0733 506 show that it is possible to install wind deflecting panels in the extension of the trailing edge of the windscreen. But these deflecting panels, adapted to deviate the air flux upwards, above the driver and the possible front passenger, does not enable to provide optimised results. In spite of their presence, there still persist turbulent recirculations inside the passenger space which are source of discomfort for the occupiers of the vehicle.

The present invention provides an improvement to uncoverable vehicles, which enables to remedy the different shortcomings of the existing equipment; this improvement takes into account the aerodynamic phenomena and in particular the phenomena associated with the movements of the vehicle in the air.

The vehicle according to the invention includes a deflecting panel which extends from the trailing edge of the windscreen and which is fitted, in its medial or central portion intended to be situated between both front seats, with intrinsic means laid out to deviate an air flux to the inside of the passenger space, in order to reduce, in the central section thereof, the turbulent air flux caused by the depression zone which lies behind the windscreen, when the vehicle runs at high or very high speed.

According to a preferred embodiment of the invention, the means enabling to deviate an air flux which flows on the passenger space are formed of a type of scoop arranged in the medial portion of the deflecting panel.

According to a first possible embodiment, the scoop in question is arranged in the rear medial portion of the deflecting panel; preferably it is in the form of a tiltable flap housed in a reservation arranged in said deflecting panel.

The corresponding flap is advantageously articulated at the rear rim of the deflecting panel, and its leading edge lies preferably orthogonal to the face of the driver.

Still according to the invention, the deflecting panel is fitted with appropriate means which enable to adjust and to hold the orientation of the flap forming a scoop, to enable to adjust the flowrate of the deviated air flux to the inside of the passenger space.

According to an embodiment variation, the uncoverable vehicle includes a deflecting panel of telescopic type which is composed at least of two lateral strips fitted with means for interconnection with the windscreen, and with a transversal panel associated with said lateral strips by a rail-type arrangement, in order to vary at will the longitudinal position of the inlet opening of the scoop.

According to another possible embodiment, the means to deviate the air flux to the inside of the vehicle are formed of a type of scoop in the form of a channel arranged on a portion at least of the length of the deflecting panel, and whereof the axis extends perpendicular to the front rim of said panel.

Preferably, the corresponding channel extends substantially over the whole length of the deflecting panel. Its inlet opening lies advantageously at the front rim of the deflecting panel, arranged substantially perpendicular to the plane P thereof; its outlet opening lies at the rear end of said deflecting panel, arranged in the plane P of said panel, or slantwise between this plane P and the plane of the inlet opening.

According to another particularity, the inlet opening of this channel has a greater section than the section of its outlet opening.

According to a particular embodiment, the deflecting panel is fitted with means which enable the articulation of its front rim on the trailing edge of the windscreen of the vehicle.

In another possible embodiment, the deflecting panel is fitted with means for interconnection with the windscreen of the vehicle, of rigid attachment type, which attachments correspond to the means for interconnecting the sliding roof with the windscreen.

According to still another possible embodiment, the uncoverable vehicle includes means which enable the articulation of the rear rim of the deflecting panel on a loop interconnected with the windscreen. According to this embodiment variation, the deflecting panel includes means which enable the automatic rising thereof failing any roofing structure, associated with a stop for limiting the rising movement thereof. These automatic rising means may consist of a system of recall spring(s) or in a simple air intake.

Still according to the invention, the distance between the trailing edge of the windscreen and the rear rim of the deflecting panel ranges between 200 and 350 mm, according to the arrangement of the vehicle and its own aerodynamics, in particular the aerodynamics of its windscreen.

The invention also concerns the wind deflector for an uncoverable vehicle as defined above; this wind deflector is composed of a deflecting panel intended for extending over the whole width of the windscreen, and it is fitted with intrinsic means enabling to deviate the air flux to the inside of the passenger space in order to oppose the formation of turbulent recirculations.

According to the embodiment selected, this deflecting panel may be integrated to the structure of the vehicle or consist of a simple accessory interconnected with the windscreen to suit the requirements.

But the invention will be better illustrated, without being limited thereto, by the following description of several embodiments given solely for exemplification purposes and represented on the appended drawings wherein.

Figure 1:
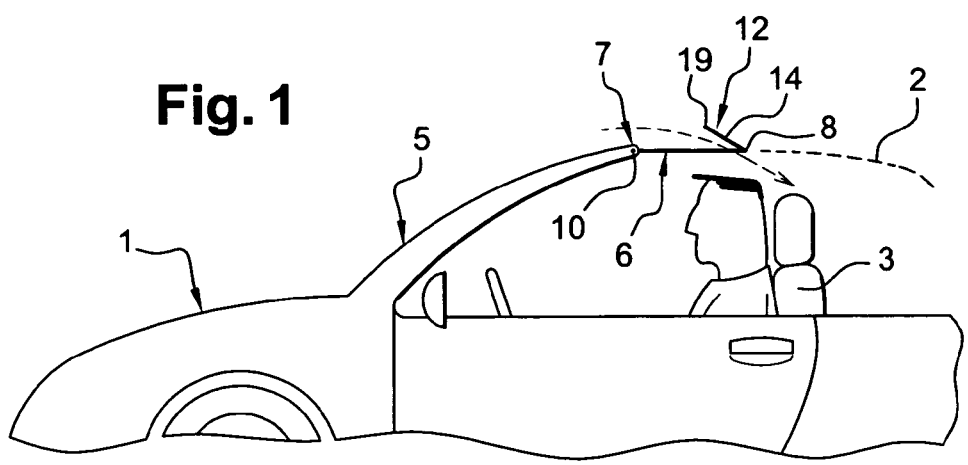
FIG. 1 is a schematic side view of an uncoverable vehicle of the convertible type, fitted with a possible embodiment with a deflecting system according to the invention.
Figure 2:
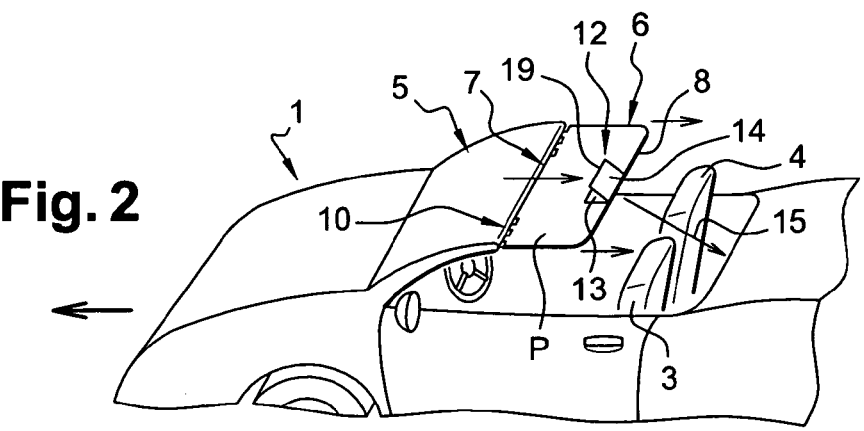
FIG. 2 is a schematic perspective top view, showing the arrangement of the deflecting system according to FIG. 1.

The vehicle 1, represented on FIGS. 1 and 2, is an uncoverable vehicle of the convertible type, with a sliding roof 2 and two front seats 3 and 4. The sliding roof 2 is illustrated as a doted line solely on FIG. 1. This vehicle 1 is represented with a single row of seats, but it may also, indistinctly, contain two rows of seats, the seats arranged at the rear being situated closer to or further apart from the front seats.

The windscreen 5 of this vehicle contains, at its trailing edge, a deflector 6 which forms a kind of extension of said windscreen towards the rear. This deflector 6 enables to guide the air flux and to protect the driver, and possibly the front passenger, which is situated just beneath.

The deflector 6 is in the form of a large transversal panel of plane P of the sun-roof type, fitted with a front rim 7 and of a rear rim 8. This panel 6 extends crosswise over the whole width of the trailing edge of the windscreen 5, and lengthwise over a few ten centimeters. Its front rim 7 is associated with the windscreen 5 by dint of an articulation system 10. This articulation 10 enables to run the deflector 6 of a retracted position, folded below the windscreen 5, at an active position, as represented on FIGS. 1 and 2, wherein it is placed substantially horizontally, in the extension of said windscreen 5.

The trailing edge 8 of the deflector 6 is extended rearwards, offering efficient protection for the persons installed at the front of the vehicle.

This deflector 6 prolongs the windscreen and includes moreover means to reduce, let alone to suppress the aerodynamic disturbances in the passenger space. These means are adapted to form a deviation of air flux, and this forced air flux is introduced in the central section of the passenger space, substantially between both front seats 3 and 4.

These deviating means of the air flux consist of a kind of scoop 12 arranged here at the rear and central section of the deflecting panel 6. This scoop 12 is formed of an opening 13 arranged in the deflecting panel 6, associated with a flap deflector 14.

This flap 14, which extends slantwise, upwards and to the front from the rear end of the opening 13, enables to deviate an air flux and to direct it inside the passenger space, to the center towards the rear of the seats, as represented by the arrow 15 on FIG. 2.

The flap 14 may be articulated at the rear rim 8 of the deflecting panel 6. Appropriate means, not represented, are provided between this flap 14 forming a scoop 12 with the opening 13, and the deflecting panel 6, for adjusting and maintaining its orientation, in order to obtain the appropriate air flowrate.

This channelling of a portion of the air which flows on the vehicle, to the center of the passenger space, as represented on FIGS. 1 and 2, opposes the formation of turbulent fluid recirculations which are generated by the depression zone situated behind the windscreen 5.

Figure 3:
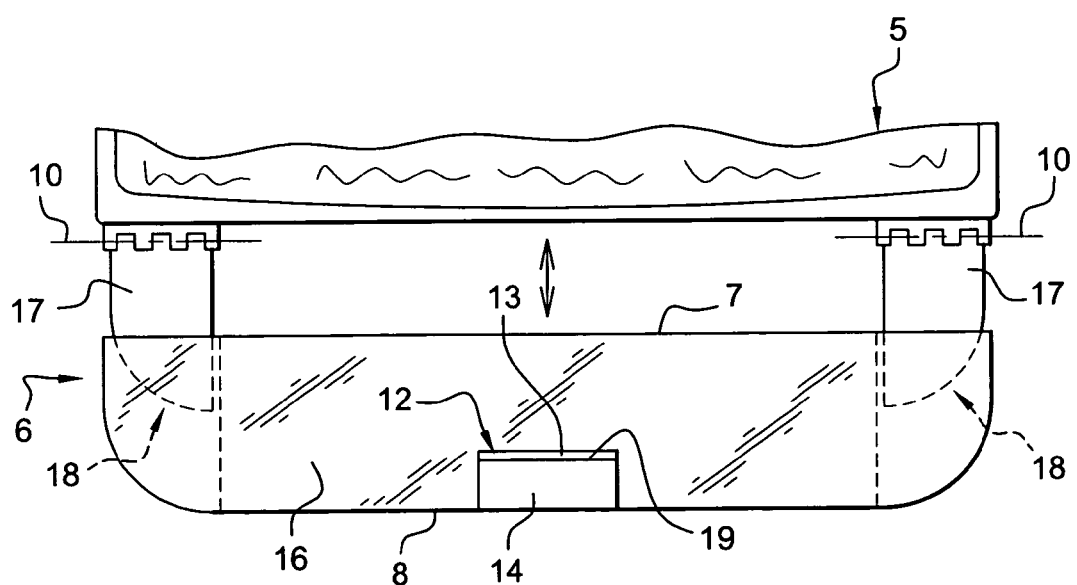
FIG. 3 is a top view of an embodiment variation of the deflecting system according to the invention

To limit the space requirements of the deflecting system, in inactive position in particular, and to enable its adaptation to all types of uncoverable vehicles, this deflecting system, as represented on FIG. 3, may be of the telescopic type.

The corresponding deflector 6 includes a transversal panel 16 interconnected with the windscreen 5 by dint of lateral strips 17 which extend longitudinally. These lateral strips 17 are articulated at the trailing edge of the windscreen using axes of articulation 10.

The lateral strips 17 form an extension of the windscreen and also channel the air flux. The space between the trailing edge of the windscreen and the upstream edge 7 of the panel 16 is relatively small, so as not to disturb the flow.

The flap 14 forming a scoop 12 with the opening 13 is positioned as previously at the trailing edge 8 of the panel 16. This flap 14 is articulated on this trailing edge 8.

The panel 16 is associated with the lateral strips 17 by dint of an arrangement in the form of rails 18. These rails 18 enable to adjust the distance of the trailing edge of the panel 16 with respect to the trailing edge of the windscreen 5.

Generally, the distance between the trailing edge of the windscreen and the trailing edge of the deflecting panel ranges advantageously between 200 and 350 mm, according to the type of vehicle and its aerodynamics, and in particular the aerodynamics of the windscreen.

The leading edge 19 of the flap 14 of the scoop 12 lies generally substantially orthogonal to the face of the driver of the vehicle, for efficient channelling of the air flux to the central section of the passenger space, between the front seats 3 and 4, at the rear section thereof.

This position of the leading edge 19 of the flap 14 is adjustable in the case of the telescopic deflector represented on FIG. 3, in order to suit the driver's position.

FIGS. 4 to 7 illustrate another embodiment variation of the deflecting system according to the invention.

Figure 4:
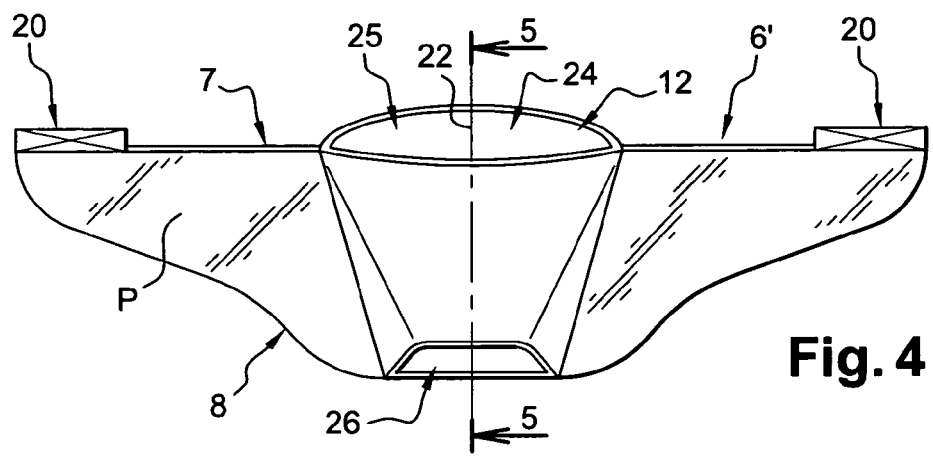
FIG. 4 is a schematic representation of another embodiment variation of a deflecting panel according to the invention, in perspective from beneath.
Figure 5:
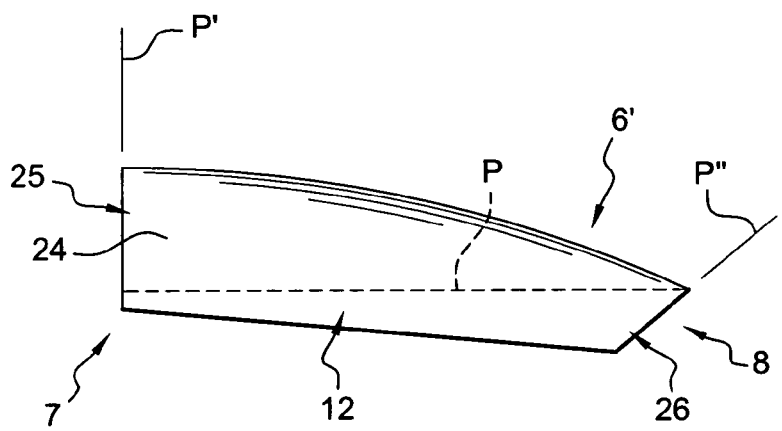
FIG. 5 is a sectional view according to 5-5 of FIG. 4.

As can be seen on FIGS. 4 and 5, this wind deflector is in the form of a panel 6' of plane P, with a front rim 7 substantially rectilinear and a rear rim 8 generally vaulted which confers thereto a length slightly greater in the center with respect to the sides.

On the sides of the front rim 7, anchoring means may be found, represented schematically in 20, intended for hooking on the complementary anchoring means laid out on the windscreen of the vehicle, to attach of the deflecting panel 6' in the extension the trailing edge of said windscreen. These anchoring means 20 are preferably adapted for rigid interconnection between the panel 6' and the windscreen 5; they correspond advantageously to the anchoring means of the sliding roof on said windscreen.

On its median axis 22, the panel 6' includes the means in the form of scoop 12 which enable to channel an air flux to the center and to the rear of the passenger space of the vehicle thus equipped.

The scoop 12 is here composed of a channel or of a kind of tunnel 24 centred on the median axis 22 of the panel 6'; this channel 24 extends perpendicular to the front rim 7 of the deflecting panel, and it extends over the whole length of this panel.

The inlet opening 25 of the channel 24 lies at the front rim 7 of the panel 6'; this inlet opening 25 is flattened and lies in a plane P' which is substantially perpendicular to the plane P of the deflecting panel 6'. The outlet opening 26 of the channel 24 lies on the rear rim 8 side of the panel 6'. This outlet opening 26 is also flattened and it extends in a slant plane P''', comprised between the plane P of the panel 6' and the perpendicular plane P' of the inlet opening 25.

The section of the inlet opening 25 is greater than the section of the outlet opening 26, and the vault of the channel 24 is arranged slantwise, or has a slightly vaulted shape in the direction of its longitudinal axis, to direct at best the air flux downwards, in association with the orientation of the outlet opening 26.

Figure 6:
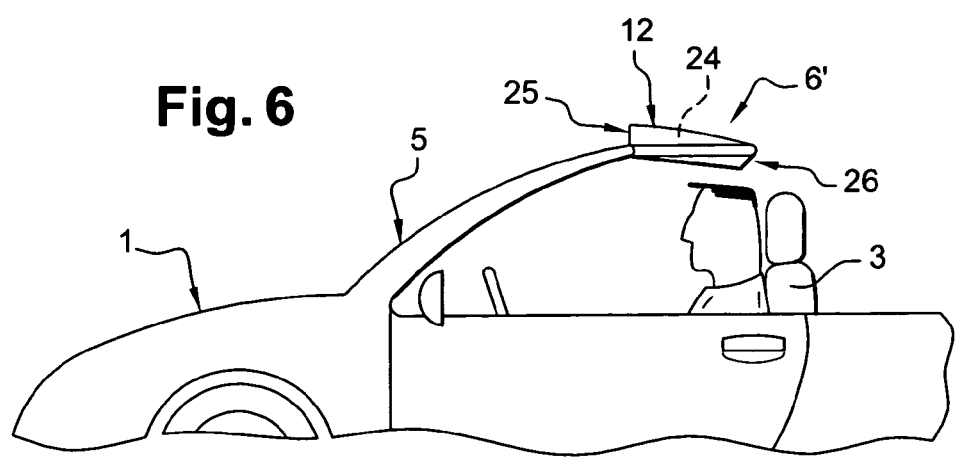
FIG. 6 is a schematic side view of an uncoverable vehicle fitted with the deflecting panel illustrated on FIGS. 4 and 5, this panel being attached directly to the windscreen.
Figure 7:
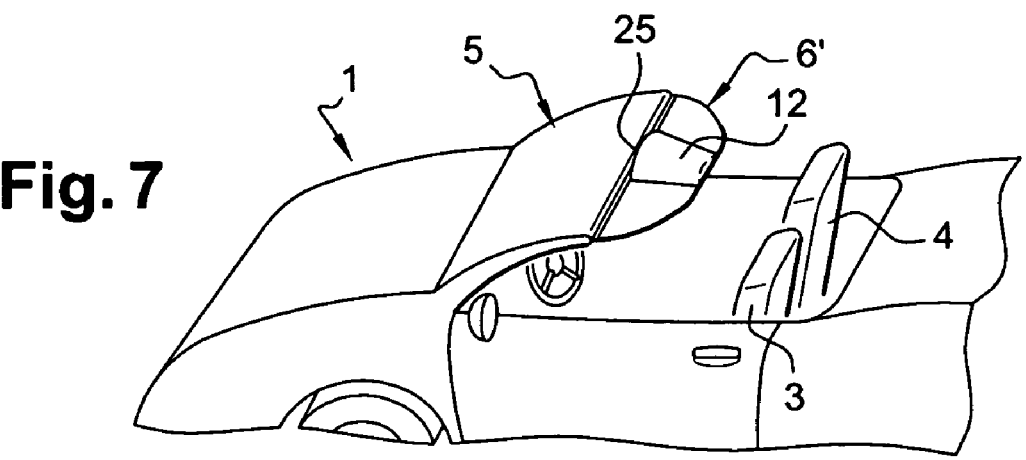
FIG. 7 is a schematic perspective top view, showing the arrangement of the deflecting system of FIGS. 4 to 6.

FIGS. 6 and 7 illustrate the deflecting panel 6' of FIGS. 4 and 5 in position, in the extension of the trailing edge of the windscreen 5 of a vehicle 1.

The greater section or the whole of the inlet opening 25 of the scoop 12 lies just above the trailing edge of the windscreen 5 and the outlet opening 26 lies between both front seats, above the heads of the front passengers.

This deflecting panel 6' may be realised by moulding a plastic material or resin. It is used as a removable accessory, mounted relative to requirements after opening the removable roof.

Figure 8:
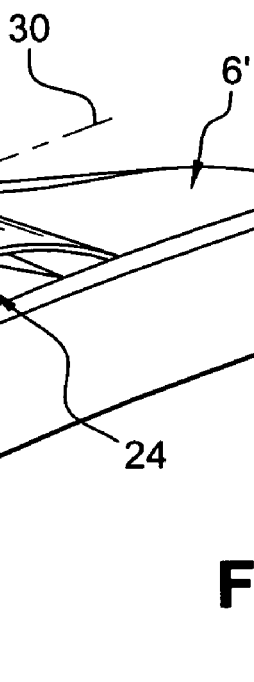
FIG. 8 is a schematic representation of another embodiment variation of the invention, comprising a deflecting panel according to FIGS. 4 and 5, articulated at its rear rim on a loop interconnected with the windscreen of the vehicle.
Figure 9:
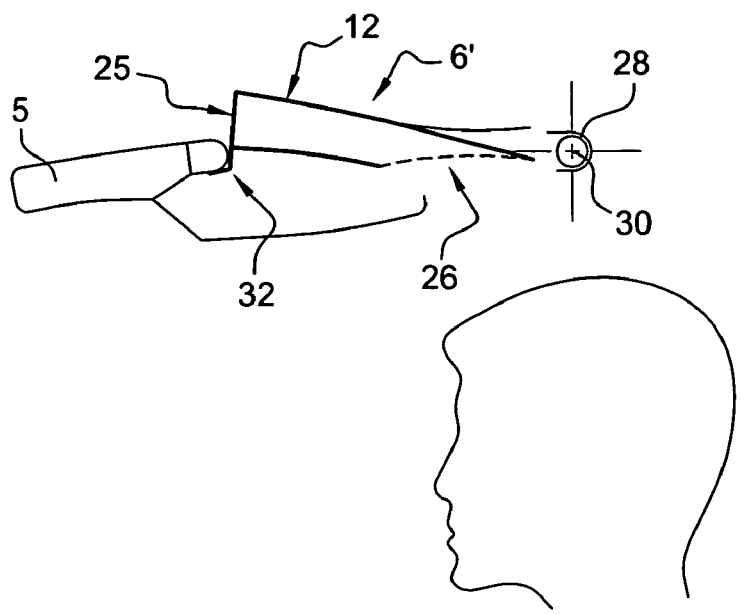
FIG. 9 is a schematic sectional view, which shows the embodiment variation of FIG. 8 with the deflecting panel in an active position.
Figure 10:
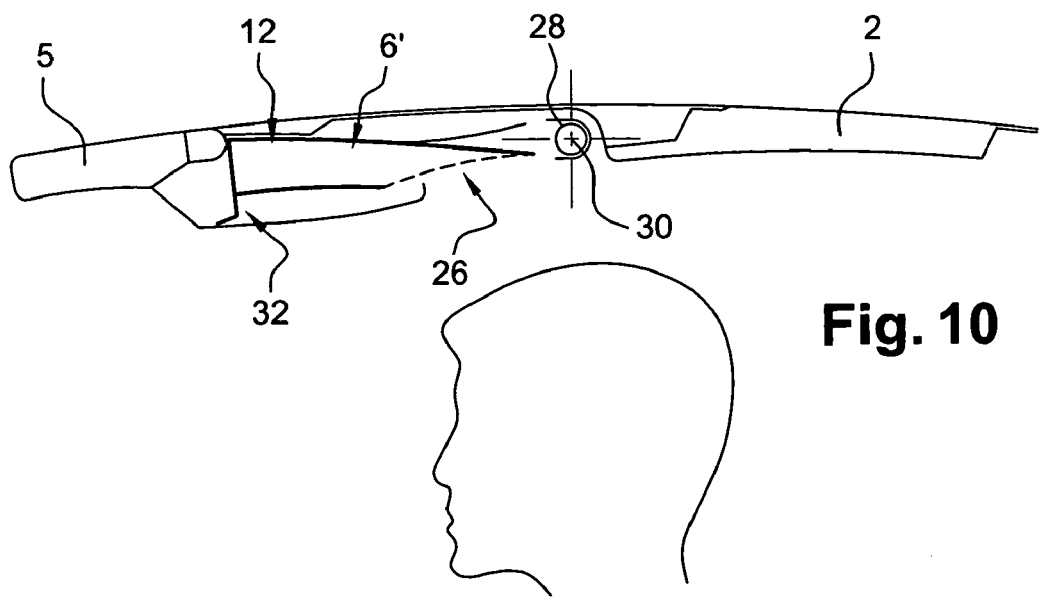
FIG. 10 is a schematic sectional view, which shows the embodiment variation of FIG. 8 with the deflecting panel in inactive position, covered by the sliding roof.

FIGS. 8 to 10 still show an embodiment variation of the invention, with a deflecting panel 6' identical or similar to that illustrated in relation with FIGS. 4 to 7, but attached here by its rear rim on a loop 28 interconnected with the windscreen 5.

The ends of the loop 28 may be attached permanently on the stanchions or on the upper crossbeam of the windscreen, and the form of this loop is adapted to that of the deflecting panel 6' so that the front rim thereof comes close to the trailing edge of the windscreen.

The rear rim 8 of the panel 6' is interconnected with the loop 28 by dint of an articulation 30, and its front rim is carried by any appropriate means to enable the retraction thereof under the trailing edge of the windscreen when it is not desired to use deflector means, and to enable the extraction thereof or the projection thereof above said windscreen to activate the deflecting system.

The position active of the deflecting panel 6' is illustrated on FIG. 9, and its inactive position is represented on FIG. 10. On this FIG. 10, the deflecting panel 6' is covered with the sliding roof 2 of the vehicle.

The front section of the deflecting panel 6' may lie on the structure of the vehicle in inactive position, and this front section may be raised to adopt an active position, when the roof of the vehicle is removed. This raising may for instance be realised by dint of an air intake system, when the vehicle runs faster than a certain speed, or still by an appropriate system of recall spring(s).

A stop system, for instance in the form of a hook 32, may be used to limit the rising of the front section of the deflecting panel 6', in order to adjust precisely its active position.

The invention claimed is:

1. An uncoverable vehicle having a passenger space and a windshield (5), a sliding roof (2) and two front seats (3, 4) in said passenger space, which vehicle also includes a wind deflector in the form of a deflecting panel (6, 6') having a front rim (7) and a rear rim (8), which deflecting panel (6, 6') extends from a trailing edge of said windshield (5), on the whole width thereof, wherein said deflecting panel (6, 6') has, in a medial portion situated between both front seats (3, 4), means (12) to deviate an air flux downward to the inside of the passenger space, between said front seats (3, 4), in order to oppose the formation of turbulent recirculations.

2. An uncoverable vehicle according to claim 1, characterised in that the means enabling to deviate an air flux to the inside of the passenger space are a scoop (12) arranged in a medial portion of the deflecting panel (6, 6').

3. An uncoverable vehicle according to claim 2, characterised in that the means enabling to deviate an air flux to the inside of the passenger space are a scoop (12) arranged in a rear medial portion of the deflecting panel (6).

4. An uncoverable vehicle according to claim 2, characterised in that the means enabling to deviate an air flux to the inside of the passenger space are a scoop (12) in the form of a tiltable flap (14) housed in a reservation (13) arranged in the deflecting panel (6).

5. An uncoverable vehicle according to claim 4, characterised in that the flap (14) is articulated at a rear rim (8) of the deflecting panel (6).

6. An uncoverable vehicle according to claim 4, characterised in that the defecting panel (6) has means enabling to adjust and to hold the articulation of the flap (14) forming a scoop (12) to maximize the flowrate of the deviated air flux.

7. An uncoverable vehicle according to claim 1, characterised in that it includes a deflecting panel (6) of telescopic type, composed at least of two lateral strips (17) including means (10) for interconnection with the windshield (5), and a transverse panel (16) associated with said lateral strips (17) by a rail (18), in order to vary at will the longitudinal position of the scoop (12).

8. An uncoverable vehicle according to claim 2, characterised in that the means to deviate an air flux to the inside of the vehicle are composed of a type of scoop (12) in the form of a channel (24) arranged on a portion at least of the length of the deflecting panel (6') and whereof the axis (22) extends perpendicular to the front rim (7) of said panel (6').

9. An uncoverable vehicle according to claim 8, characterised in that said deflecting panel (6') has a channel (24) which extends substantially on its whole length.

10. An uncoverable vehicle according to claim 9, characterised in that said deflecting panel (6') has a channel (24) whereof the inlet opening (25) lies at its front rim (7), arranged substantially perpendicular to its plane P, and whereof the outlet opening (26) lies at its rear end (8), arranged in the plane P of said panel (6') or slantwise between this plane P and the plane of the inlet opening (25).

11. An uncoverable vehicle according to claim 8, characterised in that said deflecting panel (6') has a channel (24) whereof the inlet opening (25) has a greater section than the section of the outlet opening (26).

12. An uncoverable vehicle according to claim 1, characterised in that said deflecting panel (6) has means (10) which enable the articulation of its front rim (7) on a trailing edge of the windshield (5).

13. An uncoverable vehicle according to claim 1, characterised in that it includes means which enable the articulation of the rear rim (8) of the deflecting panel (6') on a loop (28) interconnected with the windshield (5).

14. An uncoverable vehicle according to claim 13, characterised in that it includes a deflecting panel (6') fitted with means which enable the automatic rising thereof failing any roofing structure (2), associated with a stop (32) for limiting the rising movement thereof.

15. An uncoverable vehicle according to claim 1, characterised in that the distance measured between the trailing edge of the windshield (5) and the rear rim of the deflecting panel (6, 6') ranges between 200 and 350 mm, according to its aerodynamics and in particular that of its windshield (5).

16. A wind deflector for an uncoverable vehicle according to claim 1, composed of a deflecting panel (6, 6') intended for extending on the whole width of the windshield (5), which deflecting panel (6, 6') is fitted with intrinsic means (12) enabling to deviate an air flux to the inside of the passenger space, in order to oppose the formation of turbulent recirculations.

* * * * *